United States Patent [19]

Shikakura

[11] Patent Number: 5,070,503
[45] Date of Patent: Dec. 3, 1991

[54] DIGITAL INFORMATION TRANSMITTING AND RECEIVING SYSTEM

[75] Inventor: Akihiro Shikakura, Atsugi, Japan

[73] Assignee: Canon Kabushiki Kaisha, Tokyo, Japan

[21] Appl. No.: 320,089

[22] Filed: Mar. 7, 1989

[30] Foreign Application Priority Data

Mar. 9, 1988 [JP] Japan .................................. 63-55538
Mar. 9, 1988 [JP] Japan .................................. 63-55539
Mar. 9, 1988 [JP] Japan .................................. 63-55540

[51] Int. Cl.⁵ ............................................. G06F 11/00
[52] U.S. Cl. ..................................... 371/37.1; 371/2.1; 360/38.1; 358/336
[58] Field of Search ............ 371/37.4, 37.2, 37.1, 371/37.7, 37.8, 38.1, 39.1, 40.3, 31, 2.1; 360/19.1, 38.1, 40, 48, 53; 358/343, 143, 314, 336, 341, 133, 135, 141, 142, 145, 186, 188, 12, 15

[56] References Cited

U.S. PATENT DOCUMENTS

| | | | |
|---|---|---|---|
| 3,831,143 | 8/1974 | Trafton | 371/37.4 |
| 4,215,335 | 7/1980 | Doi | 371/2.1 |
| 4,329,708 | 5/1982 | Yamamoto | 371/31 X |
| 4,672,472 | 6/1987 | Sugiyama | 358/341 |
| 4,760,576 | 7/1988 | Sako | 371/37.4 |
| 4,852,102 | 7/1989 | Yamaguchi | 371/37.4 X |
| 4,914,527 | 4/1990 | Asai | 360/19.1 X |

Primary Examiner—Clark A. Jablon
Assistant Examiner—Robert W. Beausoliel
Attorney, Agent, or Firm—Fitzpatrick, Cella, Harper & Scinto

[57] ABSTRACT

A digital information transmitting and receiving system constructed of a transmitter and a receiver. The transmitter includes a high efficiency encoding circuit for compressing digital information codes using correlativity among the digital information codes, and outputting compressed information codes; an error correcting code generating circuit for sampling the compressed information codes in the direction of correlativity used by the high efficiency encoding circuit, and generating an error correcting code using the sampled compressed information codes; and a transmitting unit for transmitting a code train including the compressed information codes and the error correcting code. The receiver includes a receiving unit for receiving the code train; a first error correcting circuit for correcting an error code of the compressed information codes by using the error correcting code within the code train received by the receiving unit, the first error correcting circuit outputting an error flag representative of whether there is an uncorrectable code within the code train having a predetermined number of the compressed information codes; and a second error correcting circuit for correcting an error code of the information code in units of the predetermined number of the compressed information codes, in accordance with the error flag.

32 Claims, 7 Drawing Sheets

A: DPCM DATA
B: VOICE DATA

DIGITAL INFORMATION TRANSMITTING AND RECEIVING SYSTEM

BACKGROUND OF THE INVENTION

1. Field of the Invention

The present invention relates to a transmission system for digital information such as digital image information having correlation among its codes.

2. Related Background Art

In a transmission system of the type that information signals such as image information signals are transmitted in digital form, a generally adopted method is to transmit digital signals by converting them into transmission codes matching transmission medium such as a communication pass and recording medium. In such a case, input data are often compressed prior to encoding due to restriction of transmission bit rate, and error correcting codes are added for dealing with transmission errors.

Figure 1A:
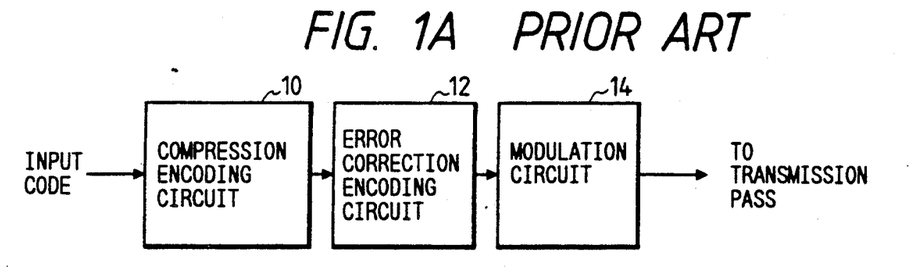
FIGS. 1A and 1B are block diagrams respectively showing the transmitting side and receiving side of a conventional digital information transmitting and receiving system.
Figure 1B:
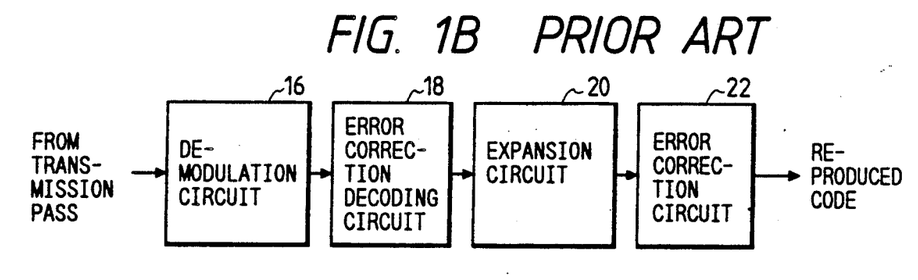

FIGS. 1A and 1B are block diagrams showing the schematic arrangement of a typical, conventional digital information transmission system, wherein FIG. 1A depicts a transmitting system and FIG. 1B depicts a receiving system. In the transmitting system, a compression encoding circuit 10 compression-encodes information codes such as digital information by using correlativity. An output from the compression encoding circuit 10 is applied to an error correction encoding circuit 12, in which it undergoes error correction encoding for dealing with transmission errors and is added with error-correcting codes. An output from the error correction encoding circuit 12 is applied to a modulation circuit which in turn modulates it in a form matching the characteristics of a transmission pass to which it is outputted.

In the receiving system on the other hand, a demodulation circuit 16 demodulates a transmitted signal from the transmission pass. An error correction decoding circuit 18 corrects errors generated on the transmission pass. An expansion circuit 20 performs expansion/decoding in the manner opposite to the compression encoding circuit 10. For those codes determined as not correctable by the error correction circuit 18 data replacement by modification such as by interpolation is conducted at an error modification circuit to modify errors of the codes.

However, mutual relationship among respective processes at the above-described conventional transmitting and receiving system has not been considered, and the overall system arrangement has been found still unsatisfactory.

Figure 2:
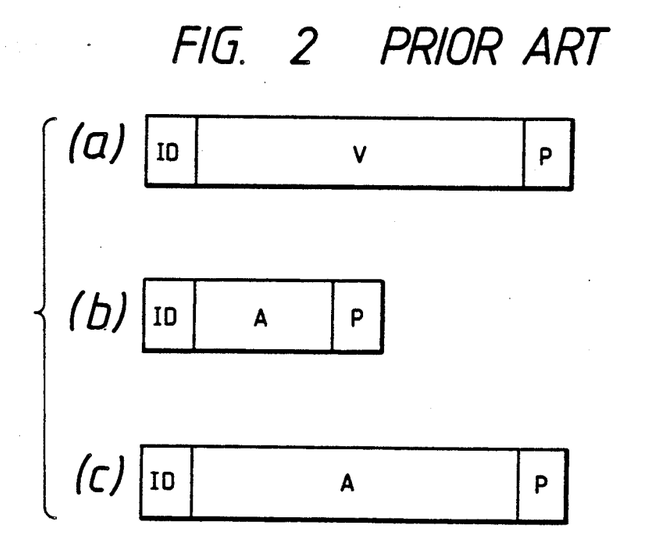
FIG. 2 shows the format of error correction blocks used in a conventional digital information transmitting and receiving system.

An information unit with error detecting/correcting codes added as described above is called an error correction block. Conventionally, for processing information codes having both image codes and voice codes to be transmitted, two methods have generally been adopted. One method comprises providing different error correction blocks for image and voice codes as shown in FIGS. 2A and 2B, and using different circuits for the correction blocks for encoding and decoding processes. The other method comprises providing error correction blocks having the same code length for both image and voice codes, and using same circuits for the correction blocks. In FIG. 2, ID represents a block number and other additional codes, V an image code, A a voice code, and P an error detecting/correcting code.

With the former method of processing image and voice codes at different circuits, the circuit arrangement becomes bulky while wastefully using circuit portions which otherwise can be used in common. With the latter method of using the error correction blocks having the same code length, the information quantity per unit time is too different between image code and voice code so that, for example, errors which are a trifle for image information may become fatal to voice information to result in noticeable deterioration of voice information.

SUMMARY OF THE INVENTION

In consideration of the above-described background, an object of the present invention is to solve the above-mentioned problems.

It is another object of the present invention to realize simplification of processing and minituarization of circuit arrangements in a code transmitting and receiving system which code is encoded at high efficiency by utilizing correlativity between information.

According to an embodiment of this invention achieving the above objects, there is provided a digital information transmitting and receiving system, comprising:

(A) a transmitter which includes
 (a) high efficiency encoding means for compressing digital information codes using correlativity among said digital information codes, and outputting compressed information codes;
 (b) error correcting code generating means for sampling said compressed information codes in the direction of correlativity used by said high efficiency encoding means, and generating an error correcting code using said sampled compressed information codes and
 (c) transmitting means for transmitting a code train including said compressed information codes and said error correcting code; and (B) a receiver which includes
 (a) receiving means for receiving said code train;
 (b) first error correcting means for correcting an error code of said compressed information codes by using said error correcting code within said code train received by said receiving means, said first error correcting means outputting an error flag representative of whether there is an uncorrectable code within said code train having a predetermined number of said compressed information codes; and
 (c) second error correcting means for correcting an error code of said information code in units of said predetermined number of said compressed information codes, in accordance with said error flag.

It is a further object of the present invention to realize simplification of circuit arrangements in a system for transmitting both image and voice information.

According to an embodiment of this invention achieving the above object, there is provided a digital information transmitting system, comprising:

(a) high efficiency encoding means for compressing digital information codes using correlativity among said digital information codes, and outputting compressed information codes;

(b) error correcting code generating means for sampling said compressed information codes in the direction of correlativity used by said high efficiency encoding means, and generating an error correcting code using a predetermined number of said sampled compressed information codes; and (c) transmitting means for transmitting a code train including said compressed information codes and said error correcting code, by using as a transmission unit an error correction block which includes said predetermined number of said compressed information codes, at least one information code not subject to said high efficiency encoding means, and an associated error correcting code.

It is a still further object of the present invention to realize simplification of processing and minituarization of circuit arrangements in a system for transmitting both main/sub information, wherein the main information is encoded at high efficiency by utilizing correlativity between information, and the sub-information is not subject to such high efficiency encoding.

According to an embodiment of this invention achieving the above object, there is provided a digital information transmitting and receiving system, comprising:

(A) a transmitter which includes (a) high efficiency encoding means for compressing main information of digital information codes using correlativity among said digital information codes, and outputting compressed main information codes;

(b) sub-information code forming means for forming sub-information codes;

(c) error correcting code generating means for generating an error correcting code using said compressed main information codes and said sub-information codes; and (d) transmitting means for transmitting a code train including said compressed main information codes, said sub-information codes, and said associated error correcting code; and (B) a receiver which includes (a) receiving means for receiving said code train;

(b) first-error correcting means for correcting error codes of said compressed main information codes and said sub-information codes by using said error correcting code within said code train received by said receiving means, said first error correcting means outputting an error flag representative of whether there is an uncorrectable code within said code train having a predetermined number of said compressed main information codes;

(c) second error correcting means for correcting an error code of said compressed main information codes in units of said predetermined number of said compressed main information codes, in accordance with said error flag; and (d) third error correcting means for correcting an error code of said sub-information codes in units of a predetermined number of said sub-information codes smaller than the first mentioned predetermined number.

The other objects and advantages of the present invention will become more apparent from the following detailed description of the embodiments when read in conjunction with the accompanying drawings.

DETAILED DESCRIPTION OF THE PREFERRED EMBODIMENTS

Figure 3A:
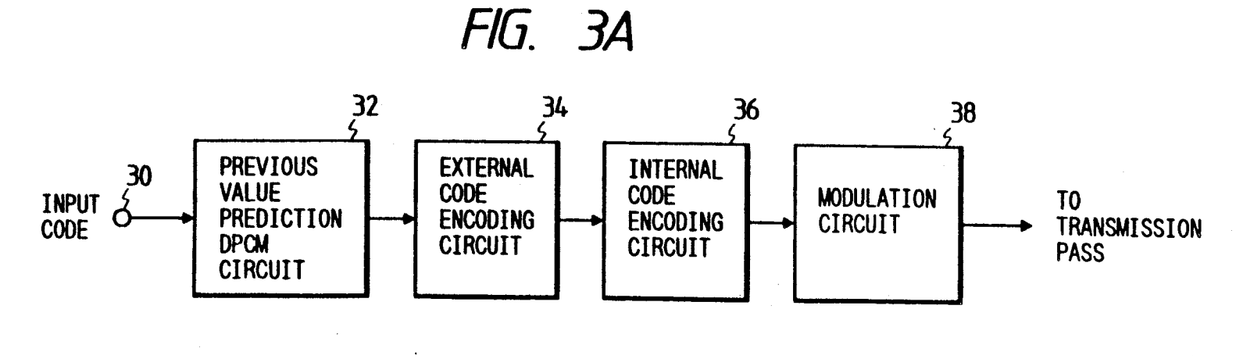
FIGS. 3A and 3B are block diagrams respectively showing the schematic circuit arrangement of the transmitting side and receiving side of a digital information transmitting and receiving system according to an embodiment of this invention.
Figure 3B:
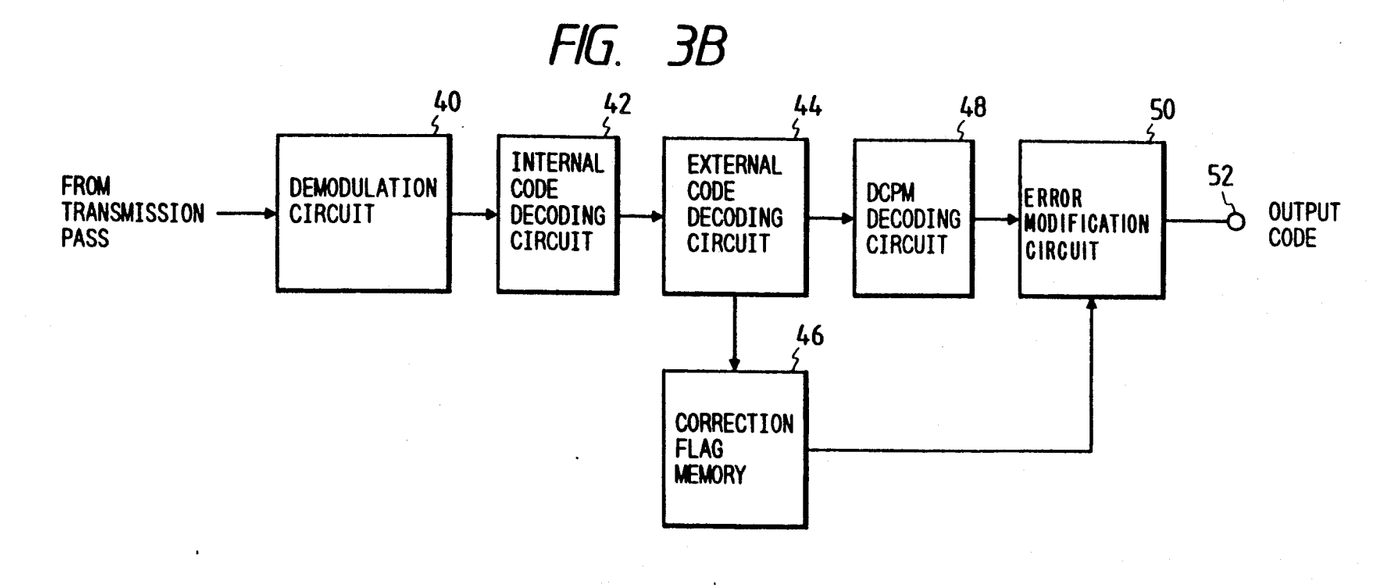

The embodiments of the invention will now be described with reference to the accompanying drawings. FIGS. 3A and 3B are block diagrams respectively showing the transmitting side and receiving side of a digital information transmitting and receiving system according to an embodiment of this invention, wherein the previous value prediction DPCM method is used as a method of compressing information codes, and double encoded codes are used as chain-encoded error correcting codes.

Figure 4:
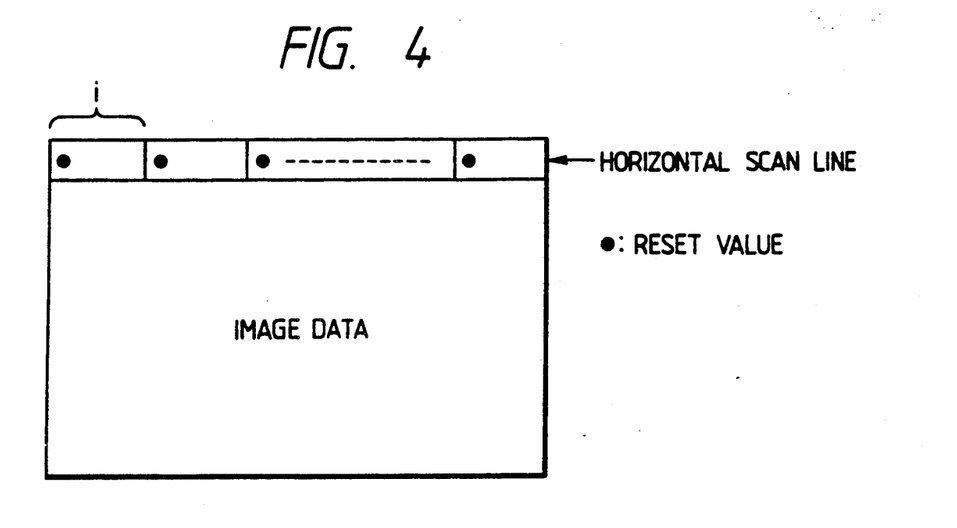
FIG. 4 is a view used for explaining the DPCM circuit in the system shown in FIGS. 3A and 3B.

Referring to FIG. 3A, horizontally scanned image signals such as television signals digitalized into image information codes are inputted to an input terminal 30. A previous value prediction DPCM circuit 32 converts the digitalized image information codes from the input terminal into a DPCM data train having a reset value and a predetermined length i as shown in FIG. 4. In this embodiment, previous value prediction is employed as the prediction method so that the direction with respect to correlativity for compression is the horizontal scan direction.

Figure 5:
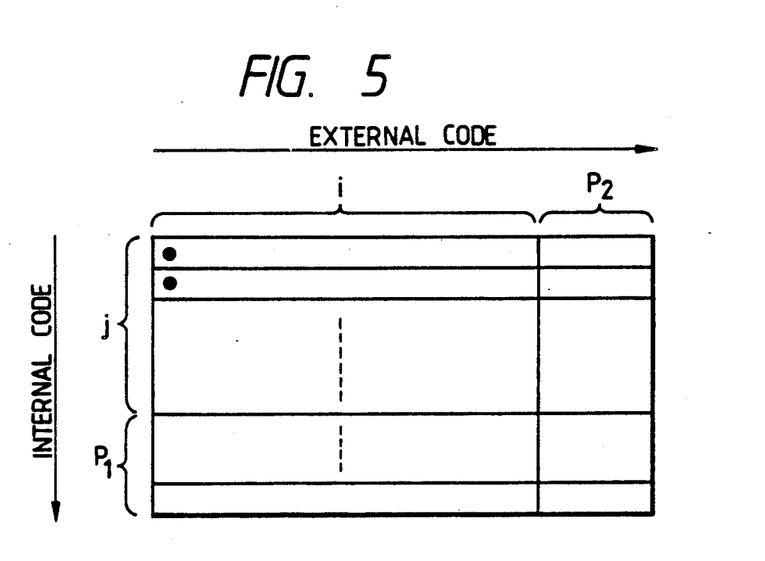
FIG. 5 is a view used for explaining code trains added with error correcting codes in the system shown in FIGS. 3A and 3B.

DPCM codes from the previous value prediction DPCM circuit 32 are added with double encoded error correcting codes at internal and external encoding circuits 34 and 36. FIG. 5 shows the format of data train with error correcting codes added thereto. In this embodiment, external codes are added in the horizontal direction of image data after DPCM, i.e., in the direction of correlativity for information compression. The number of information codes (the number of codes present in one error correction block) is i which is one unit of DPCM data inclusive of a reset value. In accordance with a predetermined error correcting code generating method, external codes are formed through addition of parities P2. In this embodiment, internal codes are added in the vertical direction of an image as shown in FIG. 5 such that parities P1 are added every j-th line of the image information. A Read Solomon code may be used as such error correcting codes.

Digital image information codes with error correcting codes added as above are modulated by a modulation circuit 38 in the form matching the characteristics of a transmission pass to which they are supplied. The transmission procedure at the transmission pass may be set as desired so long as the receiving side can definitely identify it and restore the original image.

Next, the operation at the receiving side (FIG. 3B) will be described. Signals sent from the transmission pass are demodulated at a demodulation circuit 40. An internal code decoding circuit 42 decodes the internal codes in accordance with a predetermined algorithm to thereby correct errors generated at the transmission pass as much as possible. Similarly, an external code decoding circuit 44 decodes the external codes in accordance with a predetermined algorithm to thereby correct errors. If there is any external code which is determined as not correctable at the decoding process, a correction flag representative of correction disability is set and written in a correction flag memory 46 one for each error correction block. Information signals after subjected to error correction processing at the internal and external code decoding circuits 42 and 44 are applied to a DPCM decoding circuit 48 to decode DPCM codes and restore original image codes.

Figure 6:
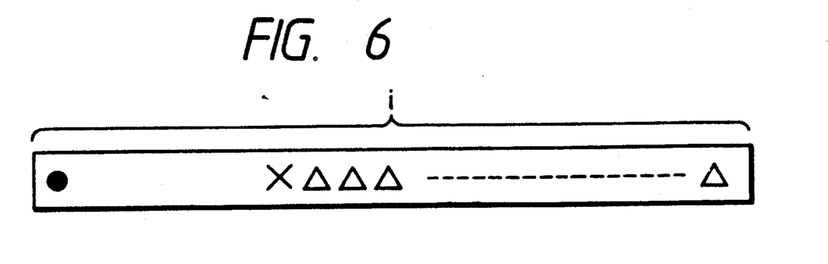
FIG. 6 is a view illustrating how errors are propagated during DPCM decoding in the system shown in FIGS. 3A and 3B.

Consider now the case where errors occur at the decoding processing for both the internal and external codes, namely, the case where errors occur in excess of the correction capability of added error correcting codes. As previously described, since a difference value from a previous value is transmitted after compression-encoding image codes through previous value prediction DPCM, if an error not correctable remains in image data, the error propagates over the following codes within one unit of DPCM, i.e., within the code train having a length i as shown in FIG. 6, resulting in errors of all the following codes. In FIG. 6, a cross mark represents a code with error not corrected, and a triangular mark represents a code which results in DPCM decoding error due to the code indicated by a cross mark.

Whether or not an output from the DPCM decoding circuit 48 is required to be modify further can be judged upon reference to a correction flag stored in the correction flag memory 46. Specifically, in this embodiment, the length of image codes within the error correction block is the same as that of the unit length of DPCM shown in FIG. 3 and a single correction flag is prepared for each unit of DPCM. Therefore, whether or not an output from the DPCM decoding circuit 48 is supplied directly to an output terminal 52 or subjected to further modification by a predetermined method can be determined immediately upon reference to the correction flag memory 46. An error modification circuit 50 further corrects the data train still having therein an error not corrected, in units of data line of length i. For example, data at previous or succeeding line are used to replace the data at the line (of length i) where an error remains, with new data.

In the above embodiment, previous value prediction has been employed as the image information compression method. However, this invention is not limited thereto, but it is also applicable to such compression method where the correlativity direction can be coincident with the constructing direction of the error correcting code decoded at the end of decoding of the chain error correction code. Further, in the above embodiment, double encoding has been employed for chain error correcting codes. However, the invention is not limited thereto, but it is also applicable to n-multiple encoding.

As appreciated from the foregoing description, the system shown in FIGS. 3A and 3B allows transmission of digital information in very short time and efficiently with small size of circuit arrangement.

Figure 7A:
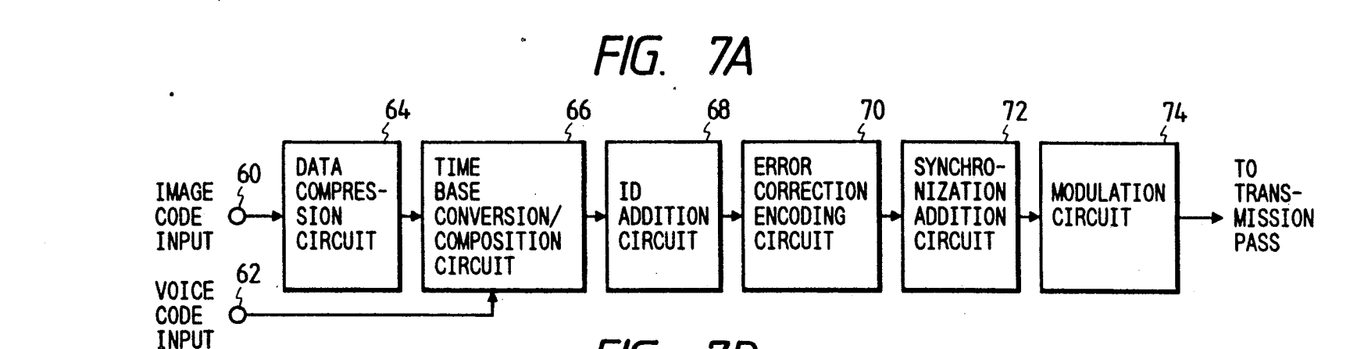
FIGS. 7A and 7B are block diagrams respectively showing a schematic circuit arrangement of the transmitting and receiving sides of a digital information transmitting and receiving system according to another embodiment of this invention.
Figure 7B:
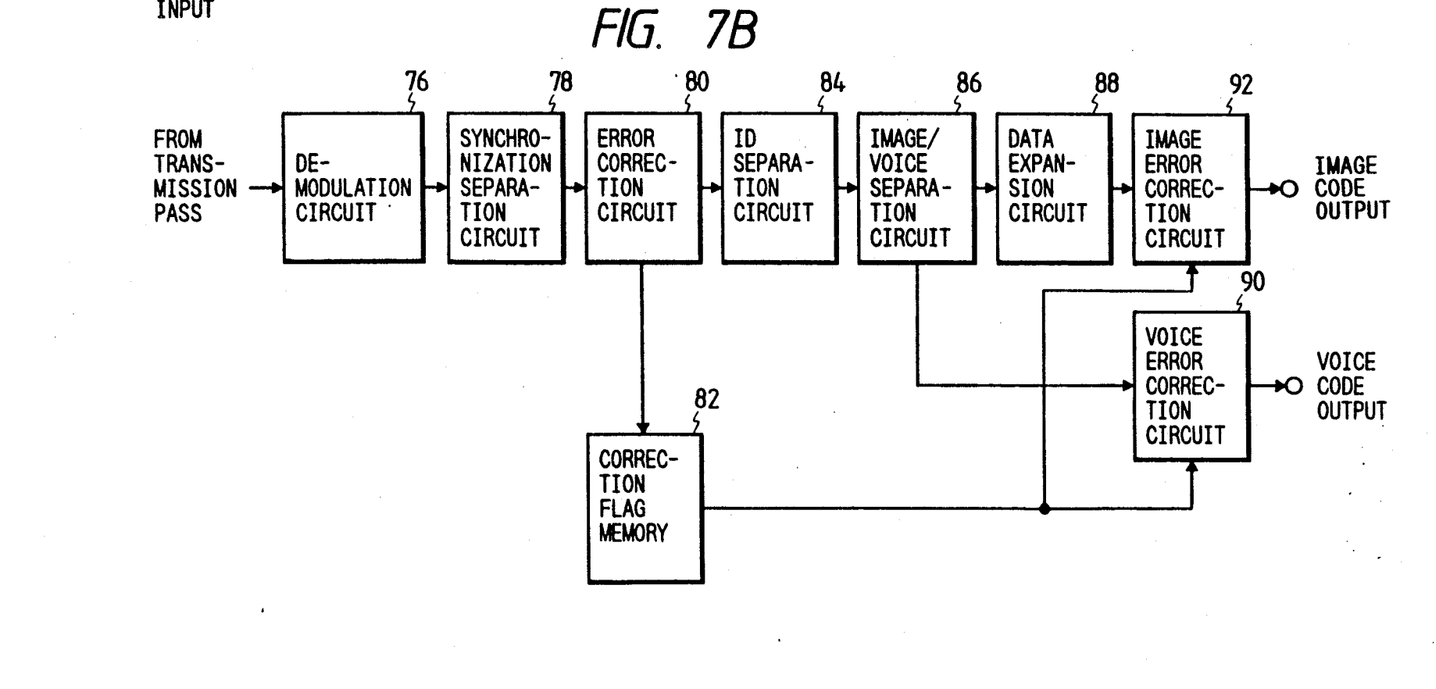
Figure 8:
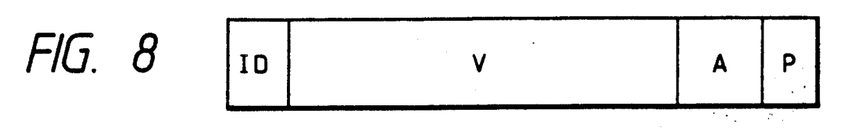
FIG. 8 shows an example of the format of an error correction block used in the system shown in FIGS. 7A and 7B.
Figure 9:
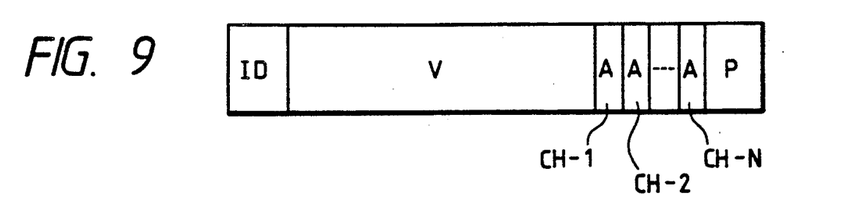
FIG. 9 shows another example of the format of an error correction block used in the system shown in FIGS. 7A and 7B.

FIGS. 7A and 7B are block diagrams showing the schematic circuit arrangement of an image/voice transmission system according to another embodiment of this invention. FIG. 8 shows the format of an error correction block used in the system shown in FIGS. 7A and 7B. In FIG. 8, ID represents a block number and other additional codes, V an image code, A a voice code, and P an error detecting/correcting code. In this format, an error detecting/correcting code P is added collectively to image codes V and voice codes A. The transmitting side adds a synchro signal and the like to the error correction block and sends them onto the transmission pass.

Assuming that image codes of $\frac{1}{3}$ line of a very fine image having 1050 effective scan lines per frame are inserted in a single error correction block, then 3150 error correction blocks are generated for each frame. In this embodiment, voice codes are dispersively inserted into 3150 error correction blocks. Even if voice codes of 4 channels are each sampled at 48 KHz, each error correction block has about two sampled units of voice codes so that there is no fear of losing all the voice codes due to burst errors.

Further, taking interpolation into consideration for the case of error occurrence, it is preferable to dispersively insert voice codes constructed of N channels into each error correction block. In this case, time sequential voice codes of each channel are dispersed further. Therefore, in further correcting data which were determined as not correctable at the time of decoding, it is possible to use for interpolation purpose the voice codes at the previous or succeeding block relative to the error correction code under consideration.

In case of voice codes of 4 channels, 4 sample units of 4 channels at the same sampling time are inserted in each error correction block to thus set the number of voice codes per each block to 4 samples. About a half of error correction blocks per frame not inserted with voice codes are provided with vacant spaces of 4 samples to make the block length the same as the other blocks.

FIGS. 7A and 7B are block diagrams respectively showing the schematic circuit arrangement of the transmitting side and receiving side of the system, which are referred to for the following description of the transmitting and receiving operation.

Figure 10:
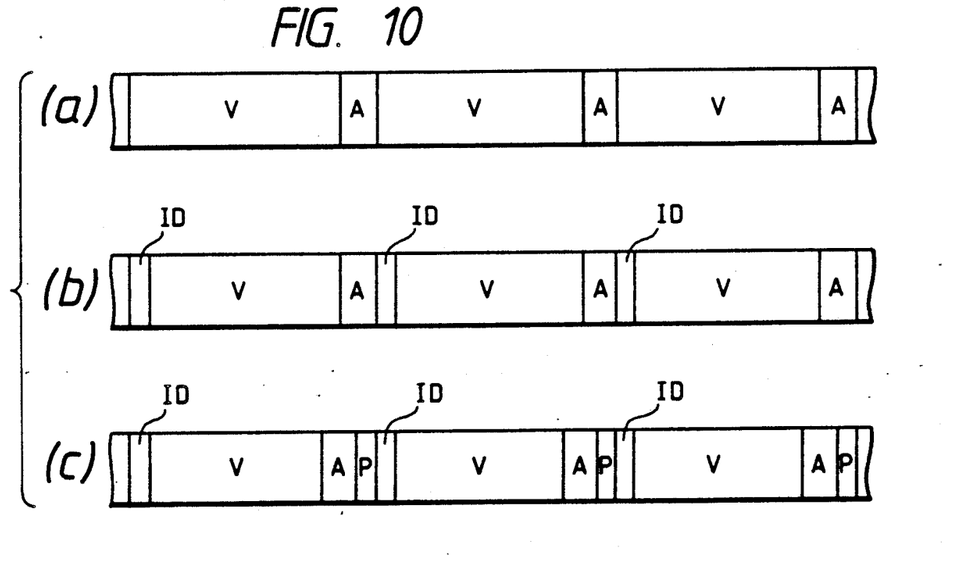
FIG. 10 illustrates the generation process of error correction blocks used, in the system shown in FIGS. 7A and 7B.

At the transmitting side shown in FIG. 7A, horizontally scanned image signals such as television signals converted into digital codes are inputted to an input terminal 60. A digital voice code train, e.g., PCM encoded code train, is inputted to an input terminal 62. A data compression circuit 64 compresses the digital image code from the input terminal by means of sub-sampling method, DPCM method or the like. A time base conversion/composition circuit 66 performs time base conversion for the image code from the data compression circuit 62 and the voice code from the input terminal 62 to thereafter compose them together as shown in FIG. 10A. In FIG. 10A, V represents a digital image code, and A a digital voice code. An ID addition circuit 68 inserts an ID code into the output from the time base conversion/composition circuit 66 for each error correction block, as shown in FIG. 10B.

An error correction encoding circuit 70 generates an error correcting code for the output from the ID addition circuit 68 for each error correction block and a parity P as shown in FIG. 10C. As an error correcting code, a Read Solomon code or other codes may be used. A synchronization addition circuit 72 adds a synchro code to the output from the error correction encoding circuit 70 to form a synchro block which is modulated at a modulation circuit 74 in the form matching the characteristics of the transmission pass.

The operation at the receiving side shown in FIG. 7B will then be described. A modulated signal from the transmission pass is demodulated at a demodulation circuit 76. The synchro signal added by the synchronization addition circuit 72 (FIG. 7A) is separated from the demodulated signal at a synchronization separation circuit 78. The separated synchro signal (not shown) is used as the reference timing for each circuit operation. The digital information code with the synchro signal separated at the synchronization separation circuit 78 is applied to an error correction circuit 80 which corrects transmission errors in accordance with a predetermined algorithm. For those blocks determined as not correctable, an error correction flag is set and written in a correction flag memory 82. A signal after subjected to error correction at the error correction circuit 80 is applied to an ID separation circuit to separate an ID code therefrom. The separated ID code is supplied to a system controller (not shown).

An image/voice separation circuit 86 separates the code train with the ID code separated at the ID separation circuit 84 into the digital image code and digital voice code which are applied to data expansion circuit 88 and voice error modification circuit 90, respectively. The data expansion circuit 90 expands the separated digital image code to apply it to an image error modification circuit 92. The voice error modification circuit 90 and image error modification circuit 92 further modify the code not corrected by the error correcting code, through interpolation by an adjacent code, while referring to the correction flag memory 82.

As appreciated from the foregoing description, the system shown in FIGS. 7A and 7B allows less deterioration of voices even under burst erros at the transmission pass. Further, a fairly large part of hardwares of the transmitting and receiving circuits can be used in common for both images and voices, thus resulting in a compact circuit arrangement.

In, the system shown in FIGS. 7A and 7B, error modification is carried out in units of one error correction block so that if an error correction block has even a single image code not correctable, the voice code in that block is also subject to error modification, resulting in an unnecessarily high occurrence frequency of error modification and hence degradation of voice quality.

Figures 11A, 11B:
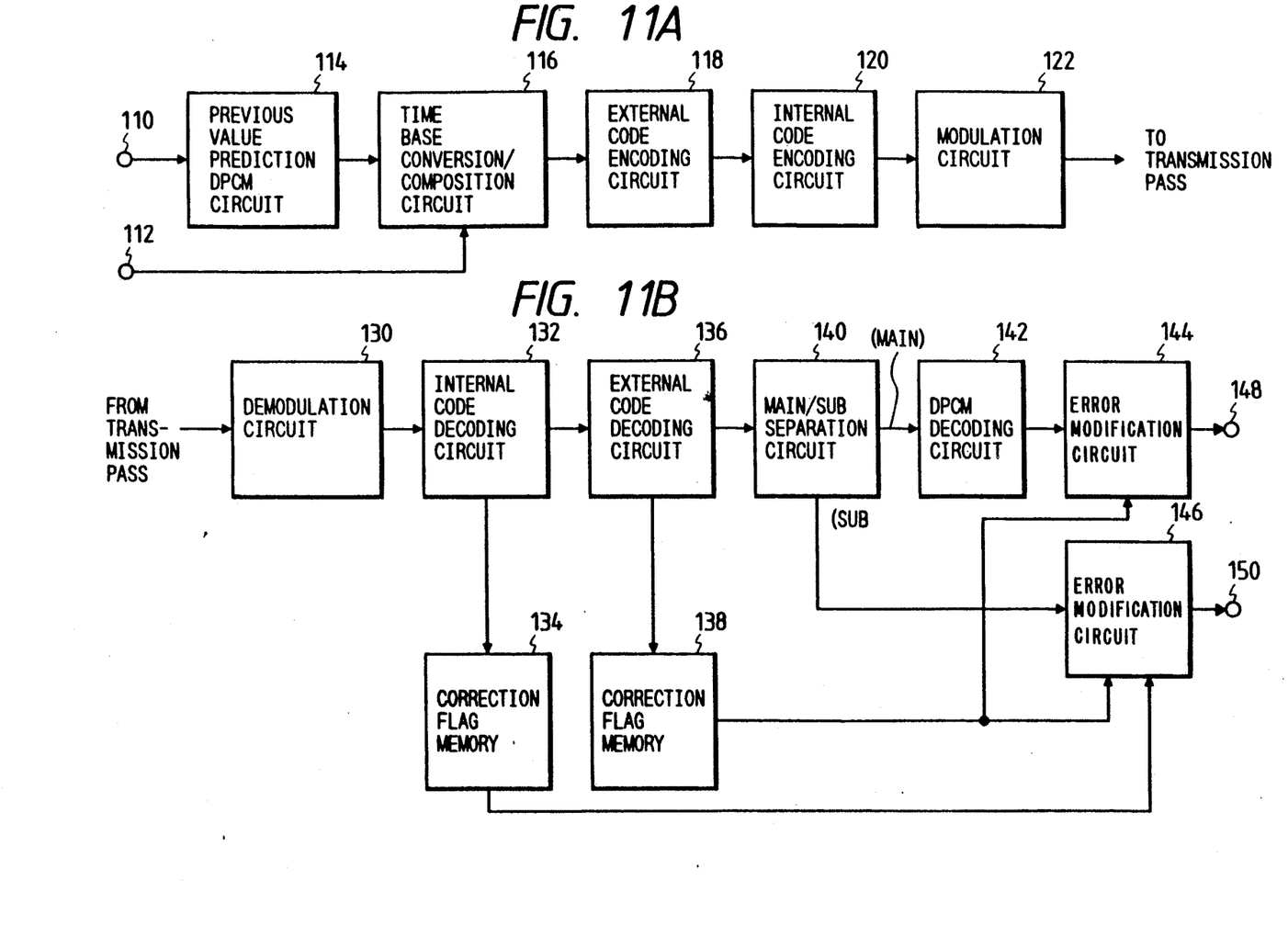
FIGS. 11A and 11B are block diagrams respectively showing a schematic circuit arrangement of the transmitting and receiving sides of a digital information transmitting and receiving system according to a further embodiment of this invention.

FIGS. 11A and 11B are block diagrams of a transmitting and receiving system according to a further embodiment of this invention which improves the above-mentioned points, and has remarkable advantages when applied to the general system transmitting both main information encoded at a high efficiency and sub-information not subject to such high efficiency encoding.

In this embodiment, it is assumed that the main information code to be transmitted is an image code, and sub-information is a voice code. The image code (main information code) uses previous value prediction DPCM as the compression method, whereas the voice code (sub-information code) is subject to PCM encoding for transmission.

Figure 13:
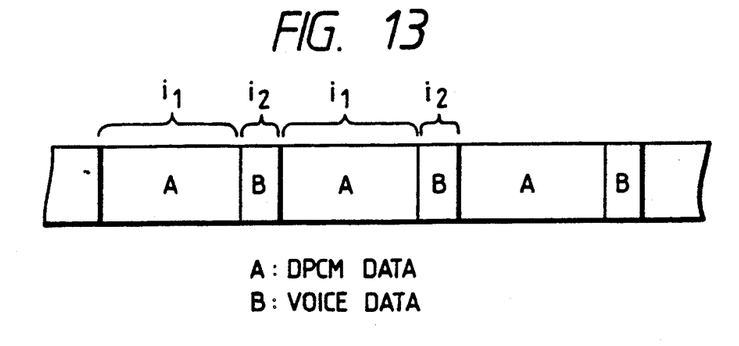
FIG. 13 shows the format of image/voice composite codes used in the system shown in FIGS. 11A and 11B.

At the transmitting side shown in FIG. 11A, horizontally scanned image signals such as television signals digitalized into an image information code train is inputted to an input terminal 110. A PCM encoded digital voice code train is inputted to an input terminal 112. A previous value prediction DPCM circuit 114 converts the digitalized image information code train from the input terminal 110 into a DPCM data train having a reset value and a predetermined length i as shown in FIG. 4. In this embodiment, previous value prediction is employed as the prediction method so that the direction with respect to correlativity for compression is the horizontal scan direction. A time base conversion/composition circuit 116 performs time base conversion for the compressed image code from the previous value prediction DPCM circuit 114 and the voice code from the input terminal 112 to thus output a composite code train as shown in FIG. 13. In FIG. 13, A represents an image code, and B a voice code. The length of consecutive image codes A is represented by i1, whereas that of consecutive voice codes B is represented by i2.

Figure 14:
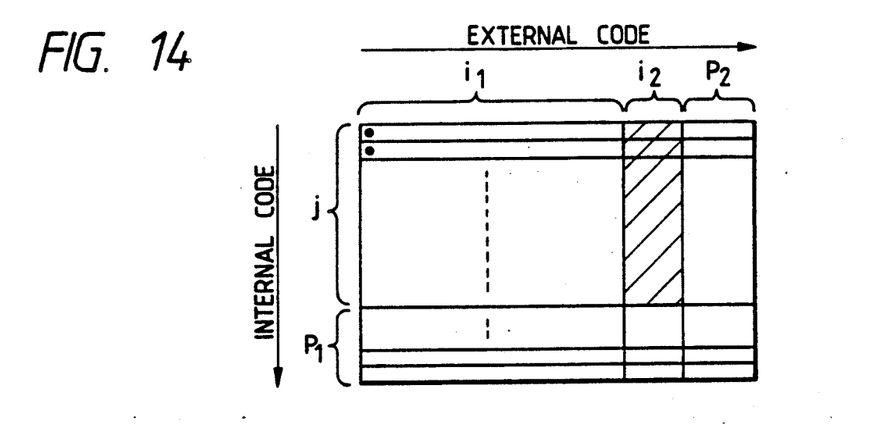
FIG. 14 shows the structure of internal and external codes used in the system shown in FIGS. 11A and 11B.
Figure 15:
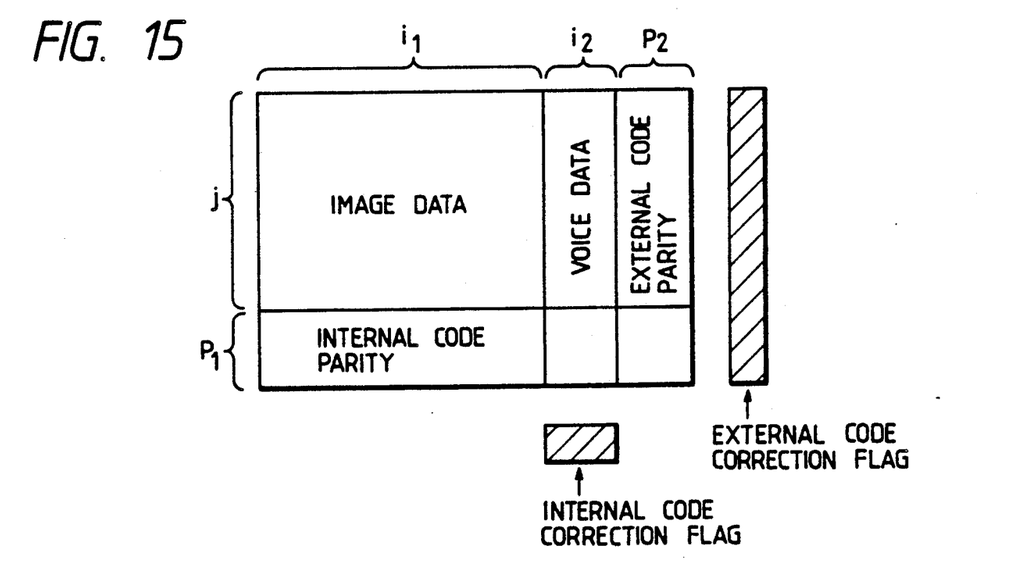
FIG. 15 is a view used for explaining a use of correction by modification flags during error correction in the system shown in FIG. 11A and 11B.

External and internal code encoding circuits 118 and 120 generate double encoded external and internal error correcting codes and add them to an output from the time base conversion/composition circuit 116. The directions of generating error correcting codes are shown in FIG. 14. The external code is added in the horizontal scan direction of DPCM image codes (namely, in the direction of correlation used in information compression), and the number of information codes is (i1+i2) which is a unit of the composite code from the time base conversion/composition circuit 116. P2 represents a parity. The internal code is added in the vertical direction of an image as shown in FIG. 14, to form a parity P1 for each unit of j lines of the composite codes. A Read Solomon code may be used as the error correcting code.

A modulation circuit 122 modulates the code train added with the error correcting code in the form matching the characteristics of the transmission pass to send it onto the pass.

Next, the operation at the receiving side shown in FIG. 11B will be described. A code transmitted from the transmission line is demodulated at a demodulation circuit 130. The internal code is decoded at an internal code decoding circuit 132 in accordance with a predetermined algorithm to correct transmission errors. The internal code decoding circuit 132 sets a correction flag representative of disability of correction and writes it in an internal correction flag memory 134 at the corresponding address if a portion of the voice codes is not correctable with the internal code. In this embodiment, in order to reduce the memory capacity and based on the fact that correction disability of image codes is determined when decoding the external codes, the internal code decoding circuit 132 does not set an internal code correction flag and does not write it in the flag memory 134 even if the image code is uncorrectable.

The external code decoding circuit 136 decodes the external code in accordance with a predetermined algorithm. The external code decoding circuit 136 sets an external code correction flag and writes it in an external code correction flag memory 138 if all the lines are not correctable.

A main/sub separation circuit 140 separates the information code error-corrected by the internal and external code decoding circuits 132 and 136 into a main code (DPCM image code) and a sub-code (voice code) and supplies them to a DPCM decoding circuit 142 and sub-information error modification circuit 146, respectively. The DPCM decoding circuit 142 decodes the DPCM image code outputted from the main/sub separation circuit 140 to apply it to a main information error modification circuit 144.

If an error cannot be corrected by the decoding process using both the internal and external codes, i.e., if errors in excess of the error correction capability are generated at the transmission pass, such uncorrectable errors give serious effects upon other image codes. Namely, as described previously, since an image code is compression-encoded through previous value prediction DPCM and a difference value from the previous value is transmitted, an error of an uncorrectable code propagates toward the following codes within the unit of an error correction block, causing the following codes after an actual error code to be all error codes (refer to FIG. 6). Therefore, for the information (main information) whose transmission quantity is compressed using correlativity, it is necessary to further modify the error code.

The main information error modification circuit 144 and sub-information error modification circuit 146 refer to the correction flag memories 134 and 138 to further modify error codes through data replacement, interpolation or the like and output them from output terminals 148 and 150. The influence of correction disability is restricted only within the unit of an error correction block so that it is preferable for the error modification circuit 144 to process as its error modification object the image code train having the length i within the associated block. Specifically, the error modification circuit 144 refers to an error correction flag in the correction flag memory 138 to further modify an error code through replacement or interpolation using a code at the previous line or succeeding line. Since an external code is provided for each unit DPCM as described previously, an external code correction flag is provided for each DPCM unit in the external code correction flag memory 138. Therefore, the modification circuit 144 can determine at once, i.e., without any arithmetic operation, whether an output from the DPCM decoding circuit 142 is sent directly to the output terminal 148, or the output is corrected before sending to the output terminal 148.

Different from the above embodiment, in the case where the direction of disposal of external codes is not made coincident with that of correlativity used by data compression, error flags obtained during decoding should be converted into flags for respective error modification units by means of a conversion circuit which performs such conversion using arithmetic operation. However, in this embodiment, such a conversion circuit and the conversion operation time are not necessary.

The sub-information modification circuit 146 refers to an internal code correction flag from the memory 134 and to an external code from the memory 138, to modify an uncorrected code. Even at the line indicated not correctable by an external code correction flag, the codes within a voice code train indicated as having no error by an internal code modification flag are not subject to error correction. As a result, voice codes are not subject to error modification even upon generation of an error of an image code, thus avoiding unnecessarily high error modification frequency of voice codes. An increase of hardwares is accordingly restricted only to the internal code correction flag memory 134 for voice codes and a gate for logical AND operation between an external code correction flag and an internal code correction flag.

In the above embodiment, previous value prediction DPCM has been used for compression of image information. Applications of the present invention are not limited thereto, but the invention is also applicable to the compression method only if it uses the correlation direction coincident with that of double encoded error correcting external codes for the main information. Further, image information has been used as the main information, and voice information has been used as the sub-information. However, applications of the present invention are not limited thereto, but piano code information, character information codes may also be used as the sub-information. A plurality of types of sub-information may also be set.

As will be understood easily from the foregoing description, not only both main information and sub-information can be transmitted while preserving suitable quality, but also unnecessarily high error modification frequency can be avoided which otherwise would have occurred due to influence of transmission errors of main information not correctable.

What is claimed is:

1. A digital information transmitting and receiving system, comprising:
(A) a transmitter which includes
 (a) high efficiency encoding means for compressing digital information codes using correlativity of a predetermined direction among said digital information codes, and outputting compressed information codes;
 (b) error correcting code generating means for taking out said compressed information codes in the direction of correlativity used by said high efficiency encoding means, and generating an error correcting code using said taken out compressed information codes; and
 (c) transmitting means for transmitting a code train including said compressed information codes and said error correcting code; and
(B) a receiver which includes
 (a) receiving means for receiving said code train;
 (b) error correcting means for correcting an error code of said compressed information codes by using said error correcting code within said code train received by said receiving means, said error correcting means outputting an error flag representative of whether there is an uncorrectable code within said code train having a predetermined number of said compressed information codes; and (c) error modifying means for modifying an error code of said information code in units of said predetermined number of said compressed information code, in accordance with said error flag.

2. A system according to claim 1, wherein said transmitting means transmits said code train by using as a transmission unit an error correction block which includes said predetermined number of said compressed information codes, at least one information code not subject to said high efficiency encoding means, and an associated error correcting code.

3. A system according to claim 2, wherein said error correcting means outputs an error flag representative of whether there is an uncorrectable code or not, in units of said error correction block.

4. A system according to claim 3, wherein said high efficiency encoding means includes a prediction encoding circuit, and said error correction block includes a predetermined number of prediction encoded codes encoded by said prediction encoding circuit, and an information code not subject to said prediction encoding circuit.

5. A system according to claim 4, wherein said prediction encoding circuit is a previous value difference encoding circuit.

6. A system according to claim 1, wherein said error correcting code generating means takes out said compressed information codes in the direction of correlativity used by said high efficiency encoding means, and includes a first error correcting code generating circuit for generating a first error correcting code based on said taken out compressed information codes, and a second error correcting code generating circuit for generating a second error correcting code based on said first error correcting code and said compressed information codes.

7. A system according to claim 6, wherein said error correcting means outputs a first error flag representative of whether there is an uncorrectable code within a code train including said predetermined number of said compressed information codes, based on said first error correcting code, and said error modifying means modifies an error of said information codes in units of said predetermined number of said compressed information codes, based on said first error flag.

8. A system according to claim 1, further comprising decoding means for decoding said information codes through data expansion of said compressed information codes subjected to said error correcting means.

9. A system according to claim 8, wherein said error modifying means modifies an error of said information codes decoded by said decoding means, based on said error flag.

10. A digital information transmitting system, comprising:

(a) high efficiency encoding means for compressing digital information codes using correlativity of a predetermined direction among said digital information codes, and outputting compressed information codes;

(b) error correcting code generating means for taking out said compressed information codes in the direction of correlativity used by said high efficiency encoding means, and generating an error correcting code using a predetermined number of said taken out compressed information codes; and (c) transmitting means for transmitting a code train including said compressed information codes and said error correcting code, by using as a transmission unit an error correction block which includes said predetermined number of said compressed information codes, at least one information code not subject to said high efficiency encoding means, and an associated error correcting code.

11. A system according to claim 10, wherein said high efficiency encoding means includes a prediction encoding circuit, and said error correction block includes a predetermined number of prediction encoded codes encoded by said prediction encoding circuit, and an information code not subject to said prediction encoding circuit.

12. A system according to claim 11, wherein said error correcting code generating means takes out said compressed information codes in the direction of correlativity used by said high efficiency encoding means, and includes a first error correcting code generating circuit for generating a first error correcting code based on said predetermined number of said taken out compressed information codes, and a second error correcting code generating circuit for generating a second error correcting code based on said first error correcting code and said compressed information codes.

13. A receiving system for receiving a code train transmitted using as a transmission unit an error correction block which includes compressed information codes obtained by compressing digital information codes using correlativity of a predetermined direction among said digital information codes, an error correcting code obtained by taking out said compressed information codes in the direction of said correlativity and using a predetermined number of said sampled compressed information codes, and at least one said digital information code, comprising:

(a) receiving means for receiving said code train;
(b) error correcting means for correcting an error code of said compressed information codes by using said error correcting code within said code train received by said receiving means, said error correcting means outputting an error flag representative of whether there is an uncorrectable code within said code train having the predetermined number of said compressed information codes; and
(c) error modifying means for modifying an error code of said information code in units of said predetermined number of said compressed information code, in accordance with said error flag.

14. A system according to claim 13, further comprising decoding means for decoding said information codes through data expansion of said compressed information codes subjected to said first error correcting means.

15. A system according to claim 14, wherein error modifying means modifies an error of said information codes decoded by said decoding means, based on said error flag.

16. A digital information system comprising:

(a) video code forming means for forming digital video information codes;

(b) audio code forming means for forming n channel digital audio information codes by using n channel audio signals, n being an integer more than 2;

(c) error correcting code generating means for generating an error correcting code using said video information codes and all of said n channel audio information codes; and (d) transmitting means for transmitting a code train using as transmission unit an error correction block which is a minimum unit for an error correction, said error correction block including said video information codes, said n channel audio information codes and an associated error correcting code.

17. A digital information transmitting system comprising:

(a) video code forming means for forming digital video information codes;

(b) audio code forming means for forming digital audio information codes;

(c) composite code forming means for forming composite information codes through time base multiplication of said video information codes formed by said video information code forming means during a predetermined period and said audio information codes formed by said audio code forming means during a predetermined period;

(d) error correcting code generating means for generating an error correcting code using said composite information codes; and (e) transmitting means for transmitting a code train using as a transmission unit an error correction block which is a minimum unit for an error correction, said error correction block including said video information codes, said audio information codes and an associated error correcting code.

18. A digital information transmitting system comprising:

(a) video code forming means for forming digital video information codes;

(b) audio code forming means for forming digital audio information codes;

(c) additional information code forming means for forming additional information codes other than said video information codes and said audio information codes;

(d) error correcting code generating means for generating an error correcting code using said video information codes, said audio information codes and additional information codes; and (e) transmitting means for transmitting a code train using as a transmission unit an error correction block which is a minimum unit for an error correction, said error correction block including said video information codes, said audio information codes, said additional information codes and an associated error correcting code.

19. A digital information transmitting system comprising:

(a) video code forming means for forming digital video information codes, said video code forming means including input means for inputting video information, and high efficiency encoding means for encoding said encoded codes as said digital video information codes; and (b) audio code forming means for forming digital audio information codes;

(c) error correcting code generating means for generating an error correcting code using said video information codes and said audio information codes; and (d) transmitting means for transmitting a code train using as a transmission unit an error correction block including said video information codes encoded at high efficiency, said audio information codes, and at least one video information code not subjected to said high efficiency encoding means.

20. A digital information transmitting and receiving system, comprising:

(A) a transmitter which includes (a) a high efficiency encoding means for compressing main information of digital information codes using correlativity of a predetermined direction among said digital information codes, and outputting compressed main information codes;

(b) a sub-information code forming means for forming sub-information codes;

(c) error correcting code generating means for generating an error correcting code using said compressed main information codes and said sub-information codes; and (d) transmitting means for transmitting a code train including said compressed main information codes, said sub-information codes, and said associated error correcting code; and (B) a receiver which includes (a) a receiving means for receiving said code train;

(b) error correcting means for correcting error codes of said compressed main information codes and said sub-information codes by using said error correcting code within said code train received by said receiving means, said error correcting means outputting an error flag representative of whether there is an uncorrectable code within said code train having a predetermined number of said compressed main information codes;

(c) first error modifying means for modifying an error code of said main information codes in units of said predetermined number of said compressed main information codes, in accordance with said error flag; and (d) second error modifying means for modifying an error code of said sub-information codes from said error correcting means in units of a predetermined number of said sub-information codes smaller than the first mentioned predetermined number.

21. A system according to claim 20, wherein said transmitting means transmits said code train by using as a transmission unit an error correction block which includes said compressed main information codes, said sub-information codes, at least one main information code not subjected to said high efficiency encoding means, and said associated error correcting code.

22. A system according to claim 21, wherein said first error modifying means modifies an error code of said main information codes in units of said error correction block.

23. A system according to claim 20, wherein said error correcting code generating means takes out said compressed main information codes in the direction of correlativity used by said high efficiency encoding means, and includes a first error correcting code generating circuit for generating a first error correcting code based on said taken out compressed main information codes and at least one said sub-information code, and a second error correcting code generating circuit for generating a second error correcting code based on said first error correcting code, said compressed main information codes, and said sub-information codes.

24. A system according to claim 23, wherein said error correcting means includes a first error correction circuit for correcting an error code by using said first error correcting code in said code train and outputting a first error flag, and a second error correcting circuit for correcting an error code by using said first error correcting code and outputting a second error flag, said second error modifying means modifies an error code of said main information codes in accordance with said first error flag in units of said predetermined number of said compressed main information codes, and said second error modifying means modifies an error code of said sub-information codes in accordance with said first and second error flags in units of one code.

25. A system according to claim 20, further comprising decoding means for decoding said main information codes through data expansion of said compressed main information codes subjected to said error correcting means, and wherein said error modifying means modifies an code of said main information codes decoded by said decoding means in accordance with said error flag.

26. A receiving system for receiving a code train including compressed main information codes obtained by compressing main information codes of digital information codes by using correlativity of a predetermined direction among said digital information codes, sub-information codes and an error correcting code generated based on said compressed main information codes and said sub-information codes, comprising:
(a) receiving means for receiving said code train;
(b) error correcting means for correcting error codes of said compressed main information codes and said sub-information codes by using said error correcting code in said code train received by said receiving means, and outputting an error flag representative of whether there is an uncorrectable code within said code train having a predetermined number of said compressed main information codes;
(c) first error modifying means for modifying an error code of said main information codes in accordance with said error flag in units of said predetermined number of said compressed main information codes; and
(d) second error modifying means for modifying an error code of said sub-information codes in units of a predetermined number of said sub-information codes smaller than the first mentioned predetermined number.

27. A system according to claim 26, wherein said error correcting code includes first and second error correcting codes, said first error correcting code being obtained by taking out said compressed main information codes in the direction of said correlativity and using said taken out compressed main information codes and at least one said sub-information code, and said second error correcting code being obtained by using said first error correcting code, said compressed main information codes and said sub-information codes.

28. A system according to claim 27, wherein said error correcting means includes a first error correction circuit for correcting an error code by using said first error correcting code in said code train and outputting a first error flag, and a second error means for correcting an error code by using said second error correcting code and outputting a second error flag, said first error correcting means corrects an error code of said main information codes in accordance with said first error flag in units of said predetermined number of said compressed main information codes and said second error modifying means modifies an error code of said sub-information codes in accordance with said first and second error flags in units of one code.

29. A receiving system for receiving a code train including video information codes, audio information codes, and an error correcting code generated based on said video information codes and said audio information codes, comprising:
(a) receiving means for receiving said code train;
(b) error correcting means for correcting error codes of said video information codes and said audio information codes by using said error correcting code in said code train received by said receiving means, and outputting an error flag representative of whether there is an uncorrectable code within said code train having a predetermined number of said video information codes;
(c) first error modifying means for modifying an error code of said video information codes in accordance with said error flag in units of said predetermined number of said video information codes; and
(d) second error means for modifying an error code of said audio information codes in units of a predetermined number of said audio information codes smaller than the first mentioned predetermined number.

30. A system according to claim 29, wherein said error correcting code includes first and second error correcting codes, said first error correcting code being obtained by using said predetermined number of said video information codes and at least one said audio information code, and said second error correcting code being obtained by using said first error correcting code, said video information codes and said audio information codes.

31. A system according to claim 30, wherein said error correcting means includes a first error correction circuit for correcting an error code by using said first error correcting code in said code train and outputting a first error flag, and a second error correction circuit for correcting an error code by using said second error correcting code and outputting a second error flag, said first error modifying means modifies an error code of said video information codes in accordance with said first error flag in units of said predetermined number of said video information codes, and said second error modifying means modifies an error code of said audio information codes in accordance with said first and second error flags in units of one code.

32. A digital information receiving system, comprising:
(a) receiving means for receiving a code train including compressed information codes and an error correcting code, said code train being transmitted by using as a transmission unit an error correction block which includes a predetermined number of said compressed information codes and an error correcting code generated by using said predetermined number of said compressed information codes;
(b) error correcting means for correcting an error code of said compressed information codes by using said error correcting code within said code train received by said receiving means, said error correcting means outputting an error flag representative of whether there is an uncorrectable code within said code train having a predetermined number of said compressed information codes; and (c) error modifying means for modifying an error code of said information code in units of said predetermined number of said compressed information code, in accordance with said error flag.

* * * * *

UNITED STATES PATENT AND TRADEMARK OFFICE
CERTIFICATE OF CORRECTION

PATENT NO.   : 5,070,503
DATED        : December 3, 1991
INVENTOR(S)  : AKIHIRO SHIKAKURA It is certified that error appears in the above-identified patent and that said Letters Patent is hereby corrected as shown below:

In the Drawings:

SHEET 5 OF 7

Figure 12:
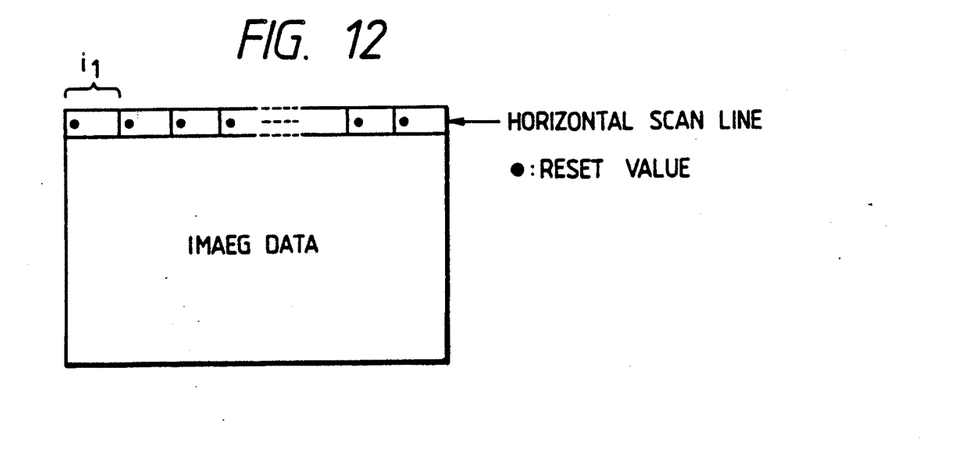
FIG. 12 is a view used for explaining DPCM encoding of image codes used in the system shown in FIGS. 11A and 11B.

FIG. 12, "IMAEG" should read --IMAGE--.

COLUMN 2

Line 8, "frifle" should read --trifle--.
    Line 35, "codes" should read --codes;--.

COLUMN 7

Line 14, "circuit 62" should read --circuit 64--.
    Line 55, "circuit 90" should read --circuit 88--.

COLUMN 13

Line 64, "and" should be deleted.

COLUMN 15

Line 24, "code" should read --error code--.

UNITED STATES PATENT AND TRADEMARK OFFICE
CERTIFICATE OF CORRECTION

PATENT NO. : 5,070,503

DATED : December 3, 1991

INVENTOR(S) : AKIHIRO SHIKAKURA

It is certified that error appears in the above-identified patent and that said Letters Patent is hereby corrected as shown below:

<u>COLUMN 18</u>

Line 6, "code," should read --codes,--.

Signed and Sealed this

Twenty-fifth Day of May, 1993

Attest:

MICHAEL K. KIRK

Attesting Officer     Acting Commissioner of Patents and Trademarks